(12) United States Patent
Zhou et al.

(10) Patent No.: US 8,571,000 B2
(45) Date of Patent: Oct. 29, 2013

(54) PEAK-TO-AVERAGE POWER RATIO (PAPR) REDUCTION SCHEME FOR WIRELESS COMMUNICATION

(75) Inventors: Yan Zhou, San Diego, CA (US); Ravi Palanki, San Diego, CA (US); Juan Montojo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 710 days.

(21) Appl. No.: 12/536,620

(22) Filed: Aug. 6, 2009

(65) Prior Publication Data

US 2010/0034186 A1 Feb. 11, 2010

Related U.S. Application Data

(60) Provisional application No. 61/087,540, filed on Aug. 8, 2008, provisional application No. 61/149,657, filed on Feb. 3, 2009.

(51) Int. Cl.
*H04L 27/28* (2006.01)

(52) U.S. Cl.
USPC .......................................................... 370/344

(58) Field of Classification Search
USPC .......................................................... 370/344
See application file for complete search history.

(56) References Cited

U.S. PATENT DOCUMENTS

| 6,950,389 | B2 | 9/2005 | Weerackody | |
| 8,059,738 | B2 * | 11/2011 | Kwon et al. | 375/261 |
| 2002/0172184 | A1 * | 11/2002 | Kim et al. | 370/344 |
| 2003/0202460 | A1 * | 10/2003 | Jung et al. | 370/208 |
| 2010/0149962 | A1 * | 6/2010 | Cho et al. | 370/210 |

FOREIGN PATENT DOCUMENTS

| EP | 1357718 A2 | 10/2003 |
| WO | 2006137693 A1 | 12/2006 |
| WO | 2007066973 A2 | 6/2007 |

OTHER PUBLICATIONS

R. O'Neill and L. B. Lopes, "Envelope Variations and Spectral Splatter in Clipped Multicarrier Signals," Proc. IEEE PiMRC '95, Toronto, Canada, Sep. 1995, pp. 71-75.
J. Armstrong, "Peak-to-average power reduction for OFDM by repeated clipping and frequency domain filtering," IEE Electr. Lett., vol. 38, No. 5, pp. 246-247, Feb. 2002.
K. G. Paterson and V. Tarokh, "On the Existence and Construction of Good Codes with Low Peak-to-Average Power Ratios," IEEE Trans. Info. Theory, vol. 46, No. 6, Sep. 2000, pp. 1974-1987.

(Continued)

*Primary Examiner* — Sulaiman Nooristany
(74) *Attorney, Agent, or Firm* — Paul Kuo

(57) ABSTRACT

Techniques for sending a transmission in a manner to reduce peak-to-average power ratio (PAPR) of the transmission are described. A transmitter may select phases for a plurality of resource blocks based on a metric, e.g., PAPR. The transmitter may apply the selected phases to modulation symbols to be sent on the resource blocks. In one design, the transmitter may select one phase for each resource block and may apply the phase to all modulation symbols to be sent on the resource block. In another design, the transmitter may select multiple phases for multiple spatial layers in each resource block, one phase for each spatial layer. The transmitter may then apply each phase to all modulation symbols to be sent on one spatial layer in one resource block. For both designs, the transmitter may generate at least one OFDM symbol or at least one SC-FDMA symbol based on the modulation symbols after applying the selected phases.

22 Claims, 9 Drawing Sheets

(56) References Cited

OTHER PUBLICATIONS

B. S. Krongold and D. L. Jones, "An Active-Set Approach for OFDM PAR Reduction via Tone Reservation." IEEE Trans. Signal Processing, vol. 52, No. 2, pp. 495-509, Feb. 2004.

B. S. Krongold and D. L. Jones, "PAR Reduction in OFDM Via Active Constellation Extension," IEEE Trans. Broadcast., vol. 49, No. 3, Sep. 2003, pp. 258-268.

A. D. S. Jayalath and C. R. N. Athaudage, "On the PAR Reduction of OFDM Signals Using Multiple Signal Representation," IEEE Commun. Lett., vol. 8, No. 7, pp. 425-427, Jul. 2004.

S. H. Han and J. H. Lee, "PAPR Reduction of OFDM Signals Using a Reduced Complexity PTS Technique," IEEE Sig. Proc. Left., vol. 11, No. 11, Nov. 2004, pp. 887-890.

Chin-Liang Wang and Yuan Ouyang, "Low-Complexity Selected Mapping Schemes for Peak-to-Average Power Ratio Reduction in OFDM Systems", IEEE Transactions on Signal Processing, vol. 53, No. 12, Dec. 2005.

A.D.S. Jayalath and C. Tellambura, "The use of interleaving to reduce the peak-to-average power ratio of an OFDM signal." IEEE GLOBECOM'00, pp. 82-86, 2000.

3GPP TS 36.211 V10.0.0, 3rd Generation Partnership Project; Technical Specification Group Radio Access Network; Evolved Universal Terrestrial Radio Access (E-UTRA); Physical channels and modulation (Release 10), (Dec. 2010), pp. 1-103.

International Search Report and Written Opinion, PCT/US2009/053199—International Search Authority—European Patent Office, Nov. 13, 2009.

Jae Hong Lee et al., "Modulation, coding and signal processing for wireless communications—An overview of peak-to-average power ratio reduction techniques for multicarrier transmission" IEEE Wireless Communications, IEEE Service Center, Piscataway, NJ, US, vol. 12, No. 2, Apr. 1, 2005, pp. 56-65, XP011130574.

Yusuke Ishida et al., "MIMO-OFDM Transmission Employing Subcarrier-Block Phase Hopping for PAPR Reduction" Vehicular Technology Conference, 2007. VTC2007—Spring. IEEE 65TH, IEEE, PI, Apr. 1, 2007, pp. 2470-2474, XP031093075.

Taiwan Search Report—TW098126830—TIPO—Sep. 27, 2012.

\* cited by examiner

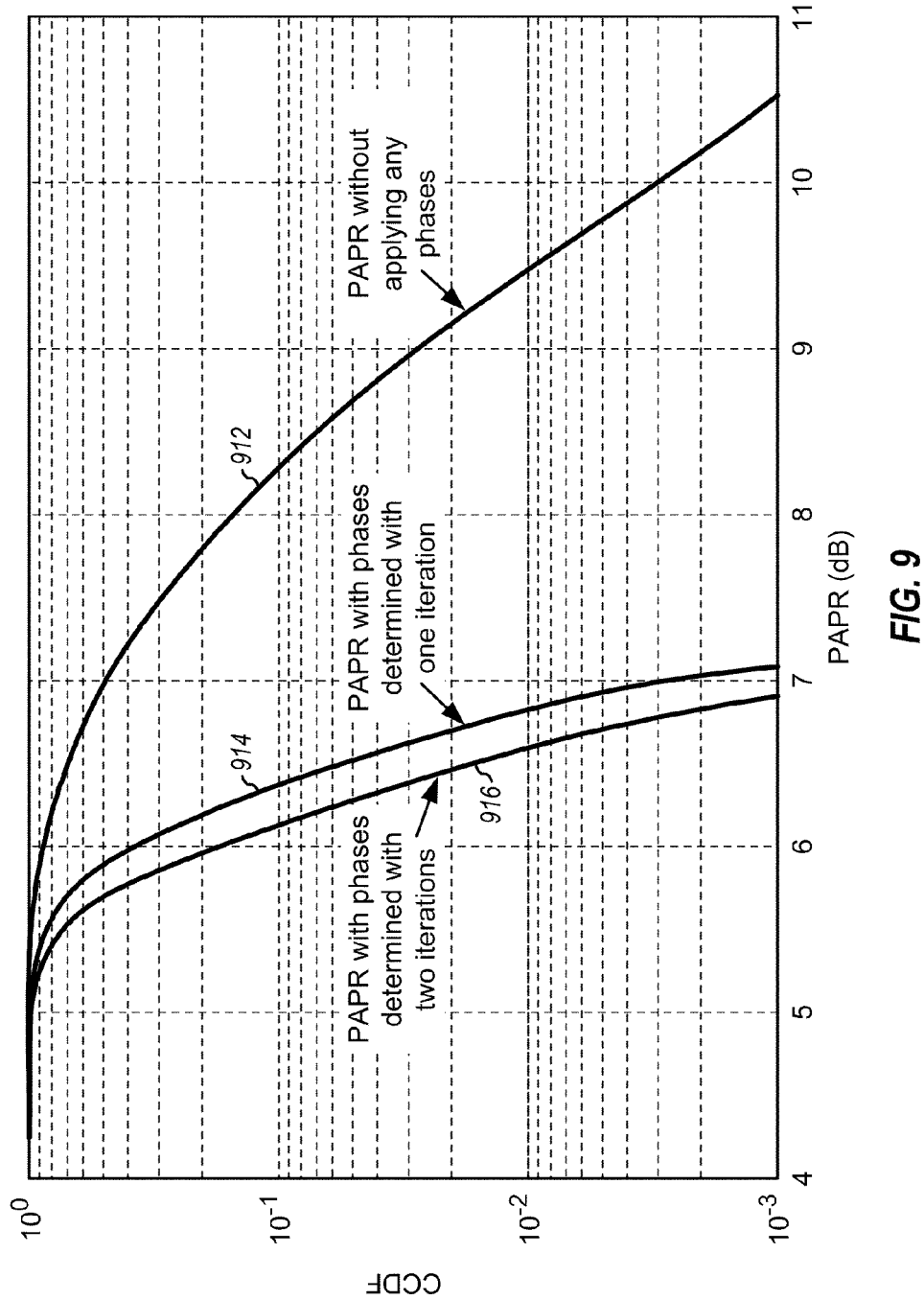

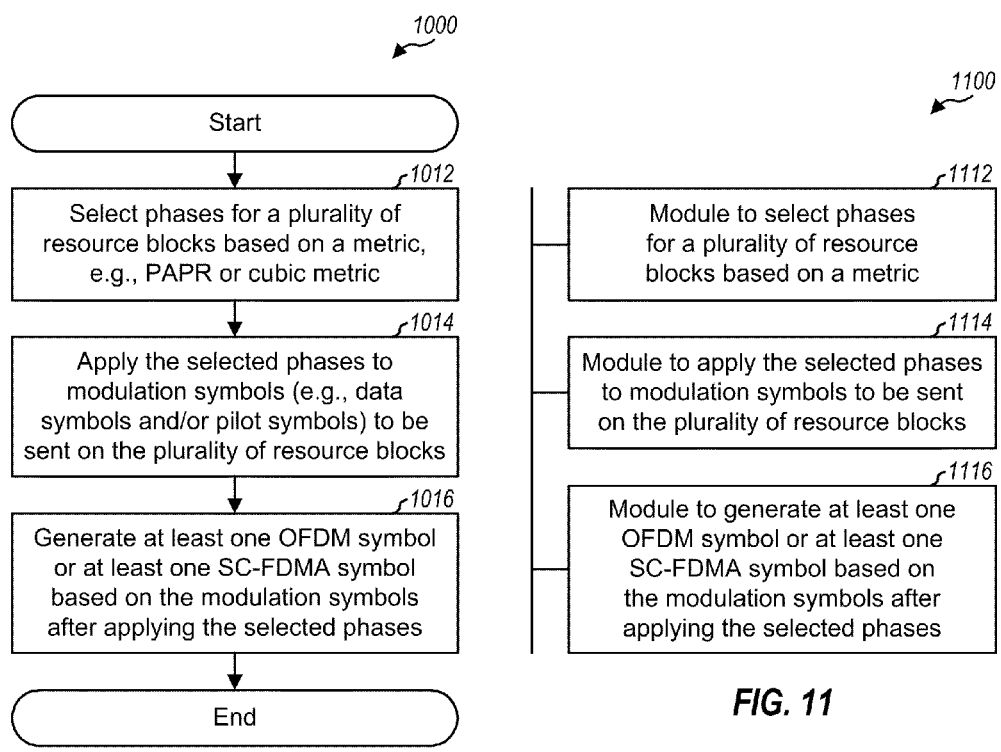

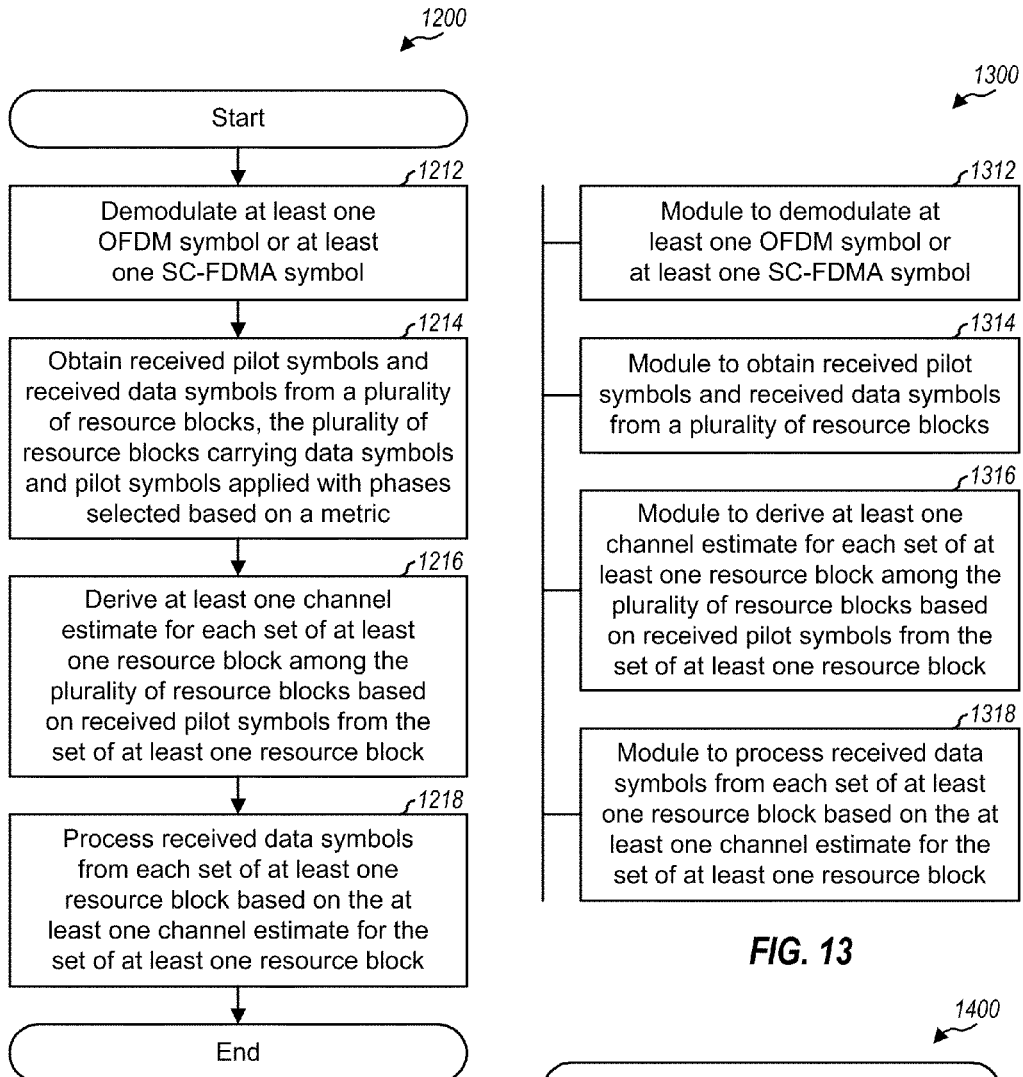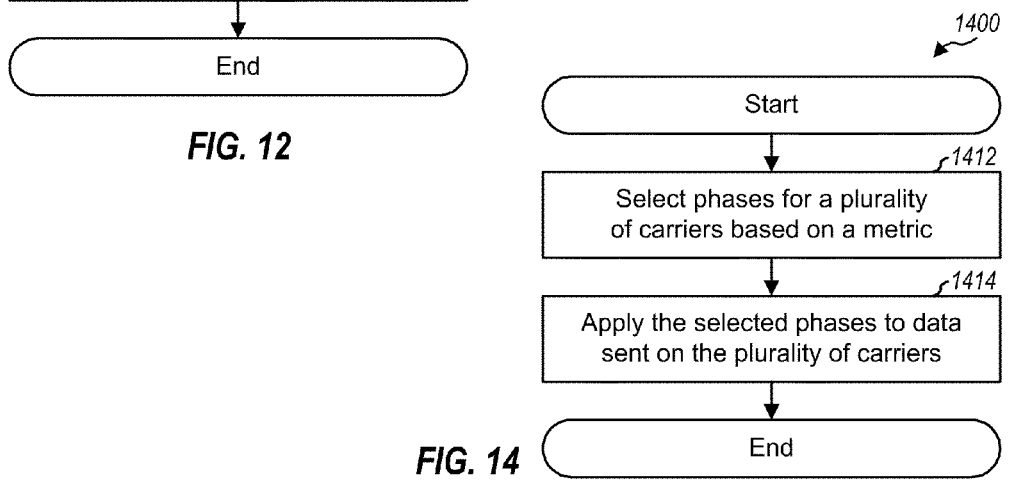

PEAK-TO-AVERAGE POWER RATIO (PAPR) REDUCTION SCHEME FOR WIRELESS COMMUNICATION

The present application claims priority to provisional U.S. Application Ser. No. 61/087,540, filed Aug. 8, 2008, and U.S. Application Ser. No. 61/149,657, filed Feb. 3, 2009, both entitled "PEAK-TO-AVERAGE RATIO REDUCTION SCHEME FOR MULTI-CARRIER SYSTEMS WITH MULTIPLE TILES IN FREQUENCY AND/OR MULTIPLE SPATIAL LAYERS," assigned to the assignee hereof and incorporated herein by reference.

BACKGROUND

I. Field

The present disclosure relates generally to communication, and more specifically to techniques for reducing peak-to-average power ratio (PAPR) of a transmission in a wireless communication system.

II. Background

Wireless communication systems are widely deployed to provide various communication content such as voice, video, packet data, messaging, broadcast, etc. These wireless systems may be multiple-access systems capable of supporting multiple users by sharing the available system resources. Examples of such multiple-access systems include Code Division Multiple Access (CDMA) systems, Time Division Multiple Access (TDMA) systems, Frequency Division Multiple Access (FDMA) systems, Orthogonal FDMA (OFDMA) systems, and Single-Carrier FDMA (SC-FDMA) systems.

A wireless communication system may support data transmission on multiple subcarriers. These multiple subcarriers may be obtained with orthogonal frequency division multiplexing (OFDM), single-carrier frequency division multiplexing (SC-FDM), or some other multi-carrier modulation scheme. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM.

Multi-carrier modulation schemes such as OFDM and SC-FDM may have certain desirable characteristics, such as the ability to combat multipath effects. However, a major drawback with OFDM, and to a lesser extend with SC-FDM, is a high PAPR of an output waveform, which means that the ratio of the peak power to the average power of the output waveform can be high. For OFDM, the subcarriers may be independently modulated with data, and high PAPR may result from possible in-phase addition of all of the subcarriers when they are independently modulated with data. In fact, it can be shown that the peak power may be up to Q times greater than the average power for OFDM, where Q is the number of subcarriers used for transmission.

A high PAPR of an output waveform generated with multi-carrier modulation normally requires a power amplifier to be operated at an average power level that may be much lower than the peak power level, i.e., backed off from peak power. This is because large peaks in the output waveform may cause the power amplifier to operate in a highly non-linear region or possibly clip, which may then cause intermodulation distortion and other artifacts that may degrade performance. By operating the power amplifier at a back-off from peak power, the power amplifier can handle large peaks in the output waveform without generating excessive distortion. However, the back-off represents inefficient operation of the power amplifier during other times when large peaks are not present in the output waveform. It may thus be highly desirable to reduce the PAPR of the output waveform.

SUMMARY

Techniques for sending a transmission in a manner to reduce PAPR of the transmission are described herein. The transmission may be sent on a plurality of resource blocks (or tiles), and each resource block may include a plurality of resource elements on which modulation symbols can be sent. In an aspect, the PAPR (or some other metric) of the transmission may be reduced by applying at least one phase to each resource block and selecting the phases for all resource blocks such that the PAPR is reduced or minimized. In one design, the same phase may be applied to all data symbols and pilot symbols sent in one resource block. A channel estimate may then be derived for each resource block based on the pilot symbols in the resource block and may be used for coherent demodulation of the data symbols in the resource block.

In one design, a transmitter may select phases for a plurality of resource blocks based on a metric, e.g., PAPR or cubic metric. The transmitter may apply the selected phases to modulation symbols to be sent on the plurality of resource blocks. The modulation symbols may comprise data symbols and/or pilot symbols. In one design, the transmitter may select one phase for each resource block and may apply the selected phase to all data symbols and pilot symbols to be sent on the resource block. In another design, the transmitter may select multiple phases for multiple spatial layers in each resource block, one phase for each spatial layer. The transmitter may then apply each phase to all data symbols and pilot symbols to be sent on one spatial layer in one resource block. For both designs, the transmitter may generate at least one OFDM symbol or at least one SC-FDMA symbol based on the data symbols and pilot symbols after applying the selected phases.

In one design, the transmitter may compute the metric for each of a plurality of phase combinations. Each phase combination may include at least one phase for each resource block. The transmitter may select a phase combination with the best metric among all of the phase combinations. The transmitter may obtain the selected phases for the plurality of resource blocks from the selected phase combination. The transmitter may evaluate the plurality of phase combinations in one or multiple iterations.

Various aspects and features of the disclosure are described in further detail below.

BRIEF DESCRIPTION OF THE DRAWINGS

FIG. 9 shows PAPR with and without applying phases to resource blocks.

FIG. 10 shows a process for transmitting data.

FIG. 11 shows an apparatus for transmitting data.
FIG. 12 shows a process for receiving data.
FIG. 13 shows an apparatus for receiving data.
FIG. 14 shows another process for transmitting data.

DETAILED DESCRIPTION

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). WiMAX is described in documents from the IEEE.

In general, the techniques described herein may be used for multi-carrier systems with multiple carriers and/or multiple subcarriers. Each carrier may have a particular center frequency and a particular bandwidth and may be used to send data. The multiple subcarriers may be obtained with OFDM, SC-FDM, or some other multi-carrier modulation scheme. The techniques may be used for the systems and radio technologies mentioned above as well as other systems and radio technologies. For clarity, certain aspects of the techniques are described below for WiMAX and LTE.

Figure 1:
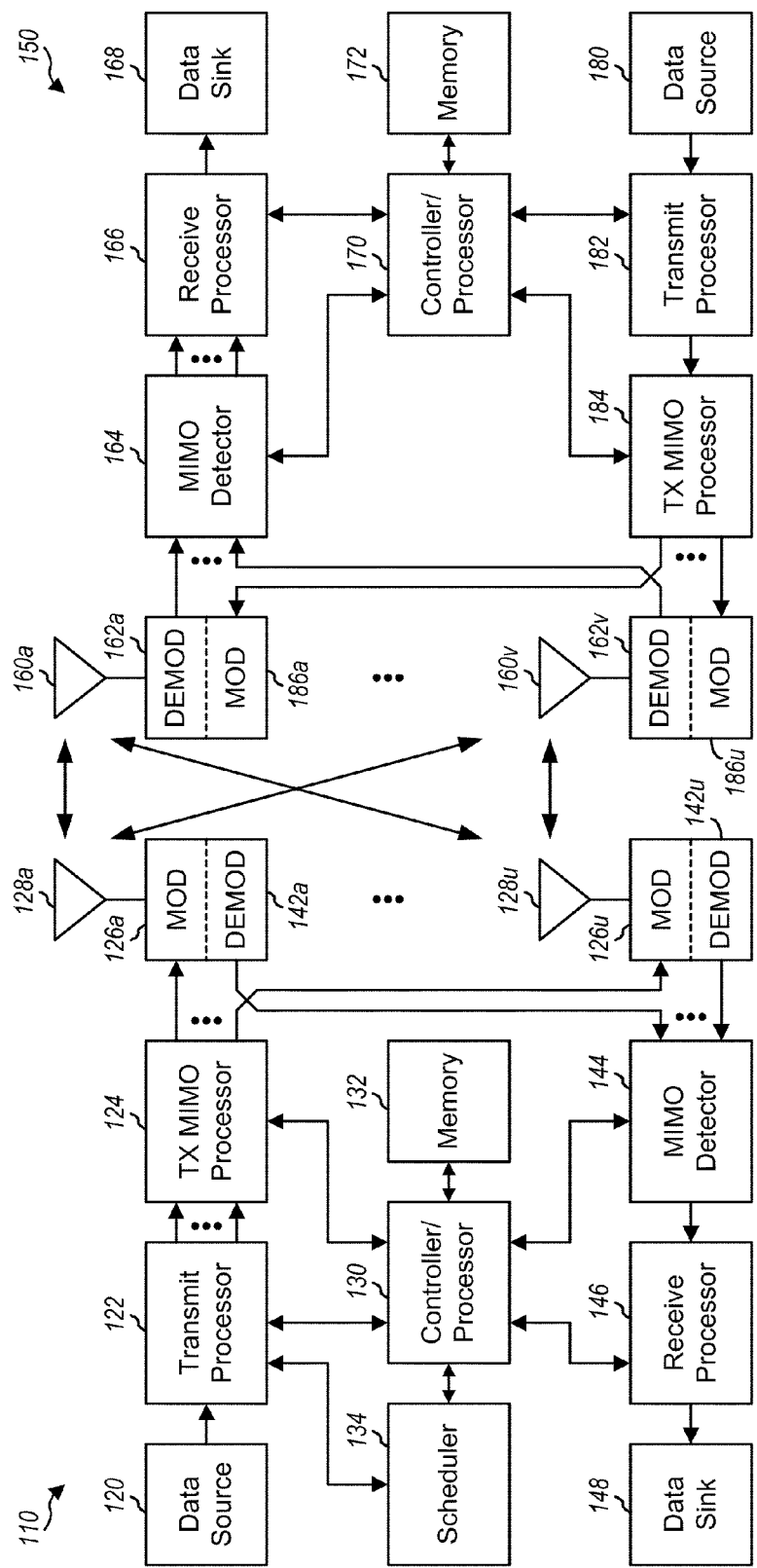
FIG. 1 shows a block diagram of a base station and a UE.

FIG. 1 shows a block diagram of a design of a base station 110 and a UE 150 in a wireless system, which may be a WiMAX system, an LTE system, or some other system. A base station may be a station that communicates with the UEs and may also be referred to as a Node B, an evolved Node B (eNB), an access point, etc. A UE may also be referred to as a mobile station, a terminal, an access terminal, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. In the design shown in FIG. 1, base station 110 may be equipped with U antennas 128a through 128u, and UE 150 may be equipped with V antennas 160a through 160v, where in general and U≥1 and V≥1.

At base station 110, a transmit processor 122 may receive traffic data from a data source 120 and control data from a controller/processor 130 and/or a scheduler 134. Transmit processor 122 may process (e.g., encode and symbol map) the traffic data and control data and obtain data symbols. Transmit processor 122 may also generate pilot symbols and may multiplex the pilot symbols with the data symbols. As used herein, a data symbol is a modulation symbol for traffic data or control data, a pilot symbol is a modulation symbol for pilot, and a modulation symbol is a real or complex value. Pilot may also be referred to as a reference signal, a demodulation reference signal, a preamble, etc. A modulation symbol may be defined by a signal constellation such as BPSK, QPSK, QAM, etc. A modulation symbol may also be defined by a polyphase sequence or some other sequence or signal. A transmit (TX) multiple-input multiple-output (MIMO) processor 124 may process (e.g., precode) the data symbols and/or the pilot symbols and may provide U output symbol streams to U modulators (MOD) 126a through 126u. Each modulator 126 may perform modulation (e.g., for OFDM, SC-FDMA, etc.) on its output symbols and provide time-domain output samples. Each modulator 126 may further condition (e.g., convert to analog, filter, amplify, and upconvert) its output samples and generate a downlink signal. U downlink signals from modulators 126a through 126u may be transmitted via U antennas 128a through 128u, respectively.

At UE 150, V antennas 160a through 160v may receive the downlink signals from base station 110 and may provide received signals to demodulators (DEMOD) 162a through 162v, respectively. Each demodulator 162 may condition (e.g., filter, amplify, downconvert, and digitize) a respective received signal to obtain input samples and may perform demodulation (e.g., for OFDM, SC-FDMA, etc.) on the input samples to obtain received data symbols and received pilot symbols. A MIMO detector 164 may derive channel estimates based on the received pilot symbols. MIMO detector 164 may further perform MIMO detection on the received data symbols with the channel estimates and provide detected data symbols. A receive processor 166 may process (e.g., symbol demap and decode) the detected data symbols, provide decoded traffic data for UE 150 to a data sink 168, and provide decoded control data to a controller/processor 170.

On the uplink, a transmit processor 182 at UE 150 may receive traffic data from a data source 180 and control data from controller/processor 170. The traffic data and control data may be processed (e.g., encoded and symbol mapped) by transmit processor 182, precoded by a TX MIMO processor 184 (if applicable), modulated by modulators 186a through 186v (e.g., for SC-FDMA, OFDM, etc.), and further conditioned by modulators 186 to generate V uplink signals, which may be transmitted via antennas 160a through 160v. At base station 110, the uplink signals from UE 150 may be received by antennas 128a through 128u, conditioned by demodulators 142a through 142u, demodulated by the demodulators (e.g., for SC-FDMA, OFDM, etc.), detected by a MIMO detector 144, and decoded by a receive processor 146. Receive processor 146 may provide decoded traffic data to a data sink 148 and provide decoded control data to controller/processor 130.

Controllers/processors 130 and 170 may direct the operation at base station 110 and UE 150, respectively. Memories 132 and 172 may store program code and data for base station 110 and UE 150, respectively. A scheduler 134 may schedule UEs for data transmission on the downlink and/or uplink and may assign resources to the scheduled ULs.

For the downlink in both WiMAX and LTE, modulators 126 may be OFDM modulators, and demodulators 162 may be OFDM demodulators. For the uplink in WiMAX, modulators 186 may be OFDM modulators, and demodulators 142 may be OFDM demodulators. For the uplink in LTE, modulators 186 may be SC-FDMA modulators, and demodulators 142 may be SC-FDMA demodulators. In general, the modulators and demodulators for each link may be dependent on the radio technology (e.g., WiMAX, LTE, UMB, Wi-Fi, etc.) used by the system for that link.

Figure 2:
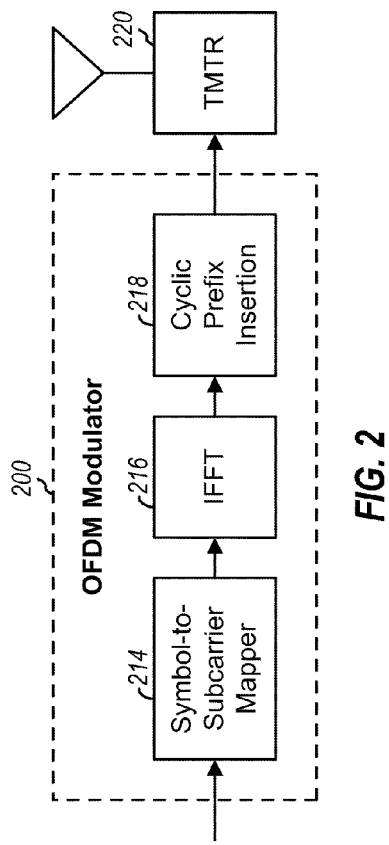
FIG. 2 shows a block diagram of an OFDM modulator.

FIG. 2 shows a block diagram of a design of an OFDM modulator 200, which may be used for modulators 126 and/or modulators 186 in FIG. 1. Within OFDM modulator 200, a symbol-to-subcarrier mapper 214 may receive data symbols and/or pilot symbols from a transmit processor, map the data symbols to subcarriers used for data transmission (or data subcarriers), map the pilot symbols to subcarriers used for pilot transmission (or pilot subcarriers), and map zero symbols with signal value of zero to remaining subcarriers not used for transmission. An inverse fast Fourier transform (IFFT) unit 216 may receive K mapped symbols for K total subcarriers in one OFDM symbol period, transform the K symbols to the time domain with a K-point IFFT, and provide a useful portion comprising K time-domain samples. Each sample may be a complex value to be sent in one sample period. A cyclic prefix insertion unit 218 may copy the last C samples of the useful portion and append the copied samples to the front of the useful portion to form an OFDM symbol comprising T=K+C samples. The repeated portion may be referred to as a cyclic prefix or a guard interval, and C is the cyclic prefix length. The cyclic prefix is used to combat intersymbol interference (ISI) caused by frequency selective fading, which is a frequency response that varies across the system bandwidth. A transmitter unit (TMTR) 220 may process and transmit the OFDM symbol in one OFDM symbol period (or simply, a symbol period), which may cover T sample periods.

The system may support N×SC-FDMA, which is a version of SC-FDMA in which information is sent on N non-contiguous sets of subcarriers in an SC-FDMA symbol, where N may be any integer value. Each set may include one or more contiguous subcarriers. The system may also support other variants of SC-FDMA such as (i) localized FDMA (LFDMA) in which information is sent on one set of contiguous subcarriers in an SC-FDMA symbol, (ii) interleaved FDMA (IFDMA) in which information is sent on a set of subcarriers distributed across the system bandwidth in an SC-FDMA symbol, etc.

Figure 3:
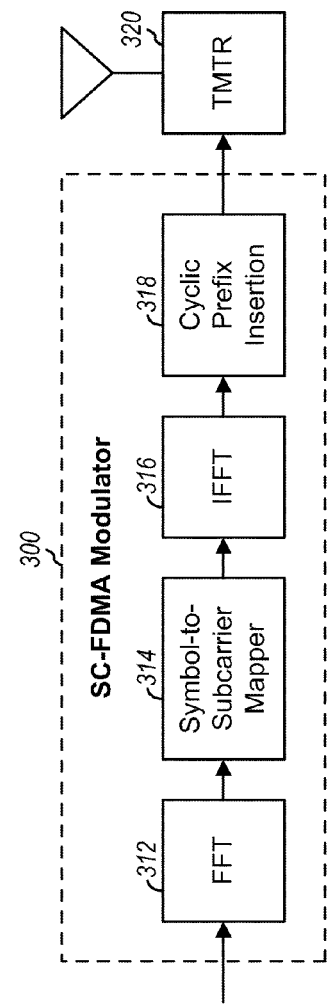
FIG. 3 shows a block diagram of an SC-FDMA modulator.

FIG. 3 shows a block diagram of a design of an SC-FDMA modulator 300, which may also be used for modulators 126 and/or modulators 186 in FIG. 1. Within SC-FDMA modulator 300, a fast Fourier transform (FFT) unit 312 may receive N sets of P data symbols and/or pilot symbols to be sent in one SC-FDMA symbol period (or simply, a symbol period), where N≥1 and P≥1. FFT unit 312 may transform each set of P data symbols and/or pilot symbols to the frequency domain and provide N sets of P frequency-domain symbols for the N sets of P data symbols and/or pilot symbols. FFT unit 312 may perform FFT operation (i) on each set of data and/or pilot symbols or (ii) across all N sets of data and pilot symbols. A symbol-to-subcarrier mapper 314 may map the N×P total frequency-domain symbols to N×P subcarriers used for transmission, map zero symbols to the remaining subcarriers, and provide K mapped symbols. An IFFT unit 316 may transform the K mapped symbols to the time domain and provide a useful portion comprising K time-domain samples. A cyclic prefix insertion unit 318 may append a cyclic prefix to the useful portion and provide an SC-FDMA symbol comprising T=K+C samples. The SC-FDMA symbol may be processed by transmitter unit 320 and transmitted in one symbol period.

As noted above, OFDM and SC-FDM may partition the system bandwidth into multiple (K) subcarriers. The spacing between adjacent subcarriers may be fixed, and the total number of subcarriers (K) may be dependent on the system bandwidth. For example, K may be equal to 128, 256, 512, 1024 or 2048 for system bandwidth of 1.25, 2.5, 5, 10 or 20 MHz, respectively, in LTE and WiMAX.

The available time-frequency resources may be partitioned into resource blocks (LTE terminology) or tiles (WiMAX terminology). The terms "resource block" and "tile" are used interchangeably herein. In LTE, a resource block may cover 12 subcarriers in one slot, which may span seven symbol periods for a normal cyclic prefix or six symbol periods for an extended cyclic prefix. A resource block may thus include 72 or 84 resource elements, with each resource element covering one subcarrier in one symbol period. On the uplink in LTE, a UE may be assigned one or more contiguous or non-contiguous resource blocks for data transmission to a base station. In WiMAX, a tile may cover four subcarriers in three symbol periods in a Partial Usage Sub-Channel (PUSC) mode. A UE may be assigned one or more contiguous or non-contiguous tiles for data transmission to a base station.

A transmitter may send data on one or more layers to a receiver. A layer may be considered as a spatial channel that may be used for data transmission. Multiple layers may be formed by a MIMO channel between multiple transmit antennas at the transmitter and multiple receive antennas at the receiver. Data may be sent simultaneously on multiple layers of the MIMO channel.

Figure 4:
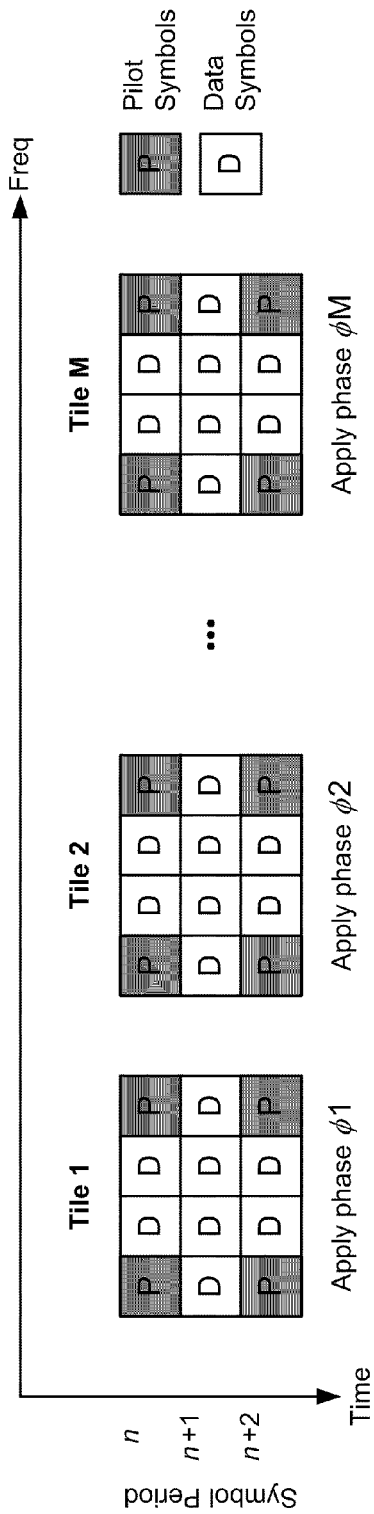
FIG. 4 shows an exemplary data transmission on a single layer in WiMAX.

FIG. 4 shows an example of data transmission on a single layer in WiMAX. A UE may be assigned M tiles, which may cover different sets of subcarriers in three symbol periods n, n+1 and n+2 of a time slot, where M may be one or greater. Each tile may include four pilot resource elements at four corners of the tile and eight data resource elements at eight remaining locations of the tile. In each tile, eight data symbols may be sent on the eight data resource elements, and four pilot symbols may be sent on the four pilot resource elements. Three OFDM symbols may be generated for the three symbol periods in which the M tiles are located.

A waveform for an OFDM symbol (or an OFDM waveform) may have poor characteristics, which may be quantified by high PAPR, high cubic metric (CM), or some other metric. High PAPR may be due to possible in-phase addition of modulated data symbols and/or pilot symbols sent on different subcarriers in one symbol period. The cubic metric may provide a measure of variations in the OFDM waveform and is described below. High PAPR and high cubic metric may degrade performance.

In an aspect, the PAPR and/or cubic metric of an OFDM waveform may be reduced by applying a suitable phase to each tile and selecting the phases for all tiles such that the PAPR or cubic metric is reduced or minimized. The same phase may be applied to all data and pilot symbols in one tile. An effective channel for each tile may then be equal to a product of an actual channel observed by the tile and the phase applied to the tile. The data and pilot symbols in each tile would observe the same effective channel. A channel estimate may then be derived for each tile based on the pilot symbols in the tile and may be used for coherent demodulation of the data symbols in the tile. The phase for each tile may affect the contribution from the modulation symbols sent in that tile to each OFDM symbol generated for the tile. The phases for all tiles may be jointly selected to obtain the lowest possible PAPR or cubic metric for all OFDM symbols generated for these tiles.

A transmitter may apply a phase of $\phi$ to a tile by multiplying each modulation symbol to be sent in the tile with a unit-magnitude phasor $e^{j\phi}$, as follows:

$$Y(n,k) = e^{j\phi} \cdot X(n,k), \quad \text{Eq (1)}$$

where $X(n,k)$ is a modulation symbol to be sent on subcarrier k in symbol period n, and $Y(n,k)$ is a phase-rotated symbol for subcarrier k in symbol period n.

In one design, a phase may be applied to each tile. As shown in FIG. 4, a phase of $\phi 1$ may be applied to tile 1, a phase of $\phi 2$ may be applied to tile 2, and so on, and a phase of $\phi M$ may be applied to tile M. The M phases φ1 to φM may be selected to minimize the maximum PAPR or cubic metric of the three OFDM symbols generated for the M tiles, as described below. In general, a phase may be applied to one or more tiles. In any case, an OFDM symbol may be generated for each symbol period based on the phase-rotated symbols in the M tiles for that symbol period.

A receiver may obtain received data symbols and received pilot symbols from the M tiles. In one design, the receiver may derive a channel estimate for each tile based on the received pilot symbols from that tile. Since the pilot and data symbols in each tile observe the same effective channel, the receiver can estimate the effective channel for each tile based on the received pilot symbols and does not need to know the actual channel for that tile. The receiver may derive the channel estimate for each tile using a minimum mean square error (MMSE) technique, a least-square technique, or some other channel estimation technique. The channel estimate for each tile may comprise a complex channel gain for each resource element in the tile. The receiver may then perform coherent demodulation (i.e., detection or equalization) for the received data symbols in each tile based on the channel estimate for that tile. The receiver may perform channel estimation and coherent demodulation for each tile separately and does not need to know the phase applied to the tile by the transmitter.

In another design, the receiver may derive a channel estimate for multiple tiles (e.g., for all M tiles) based on the received pilot symbols from these multiple tiles. In this design, the transmitter may send information indicating the phases applied to the M tiles. Alternatively, the receiver may estimate the phases applied to the tiles based on the received symbols from these tiles. For example, the receiver may use non-coherent detection with maximum likelihood criterion and channel statistics to determine the phase combination that is most likely to have been transmitted based on the received pilot symbols. The receiver may then remove the phase from each tile, e.g., by multiplying each received symbol from the tile with a phasor $e^{-j\phi_m}$ for the tile. The receiver may derive the channel estimate for the multiple tiles based on the received pilot symbols from these tiles, after removing the phases. The receiver may then perform coherent demodulation for the received data symbols from the multiple tiles with the channel estimate for these tiles. The receiver may be able to derive a better channel estimate for the multiple tiles based on more received pilot symbols. The better channel estimate may improve performance.

Figure 5:
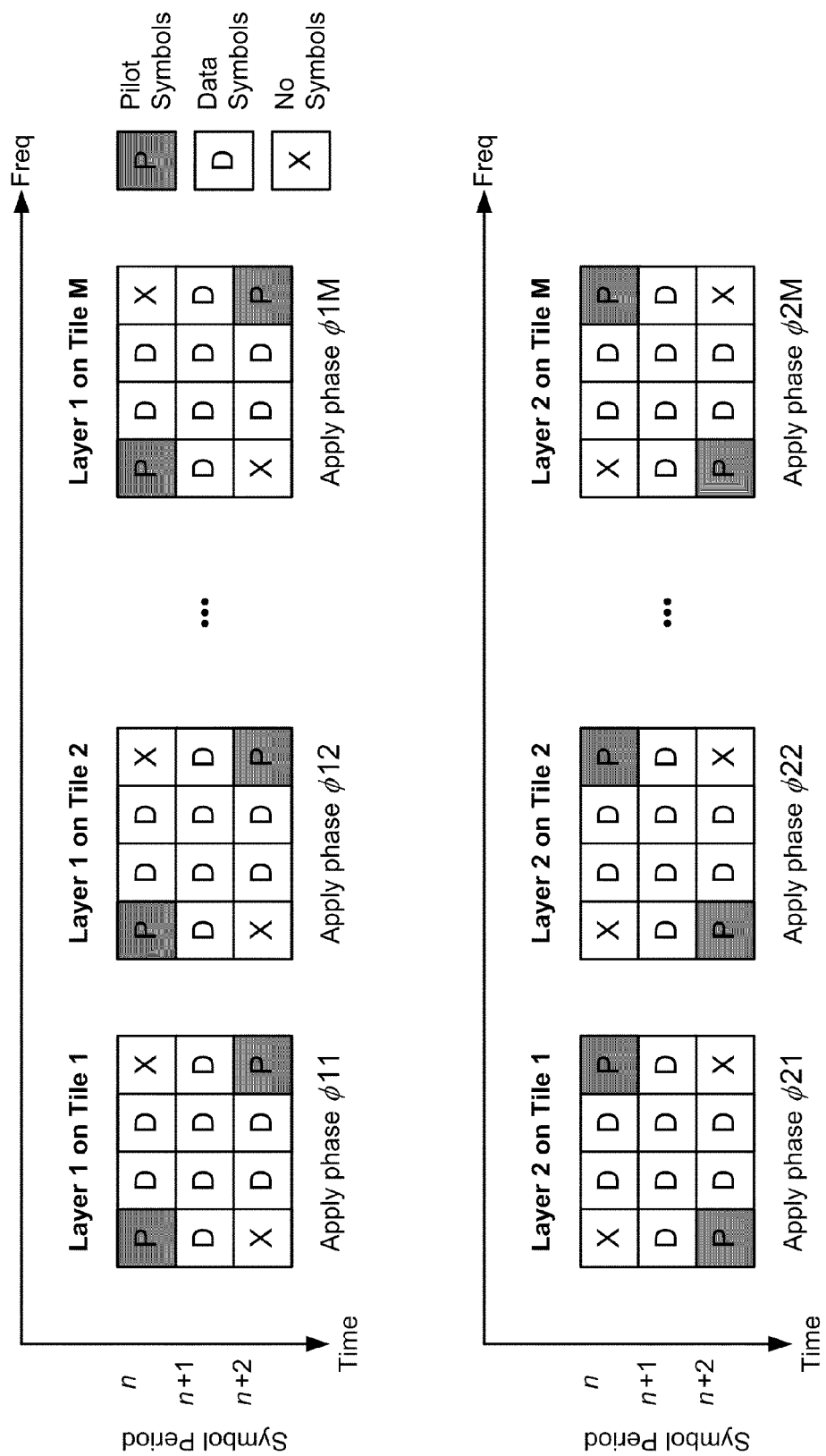
FIG. 5 shows an exemplary data transmission on two layers in WiMAX.

FIG. 5 shows an example of data transmission on two layers in WiMAX. A UE may be assigned M tiles, which may cover different sets of subcarriers in three symbol periods of a time slot. Each tile may include four pilot resource elements at four corners of the tile and eight data resource elements at eight remaining locations of the tile. In the design shown in FIG. 5, each layer may be assigned a different pair of pilot resource elements at two diagonal corners of each tile. For example, layer 1 may be assigned the pilot resource elements in the upper left and lower right corners of each tile, and layer 2 may be assigned the pilot resource elements in the lower left and upper right corners of each tile.

For layer 1, eight data symbols may be sent on the eight data resource elements of each tile, and two pilot symbols may be sent on the two pilot resource elements assigned to layer 1 in each tile. For layer 2, eight data symbols may be sent on the eight data resource elements of each tile, and two pilot symbols may be sent on the two pilot resource elements assigned to layer 2 in each tile. Each tile may thus carry four pilot symbols and 16 data symbols for the two layers. Two data symbols may be sent on the two layers in each data resource element. The two data symbols may be transmitted from each transmit antenna by performing precoding with a precoding matrix. For example, two layers may be sent from four transmit antennas by performing precoding with a 4×2 precoding matrix.

In one design that is shown in FIG. 5, a phase may be applied to each layer in each tile prior to precoding. For layer 1, a phase of φ11 may be applied to tile 1, a phase of φ12 may be applied to tile 2, and so on, and a phase of φ1M may be applied to tile M. For layer 2, a phase of φ21 may be applied to tile 1, a phase of φ22 may be applied to tile 2, and so on, and a phase of φ2M may be applied to tile M. The data symbols and pilot symbols for each layer in each tile may be multiplied with the phase for that layer in that tile to obtain phase-rotated symbols for the layer and tile, e.g., as shown in equation (1). Precoding may then be performed on the phase-rotated symbols for the two layers in the M tiles to obtain output symbols for the multiple transmit antennas. Three OFDM symbols may be generated for each transmit antenna in the three symbol periods based on the output symbols for that antenna. The 2M phases φ11 to φ2M for the two layers in the M tiles may be selected to minimize the maximum PAPR or cubic metric of the OFDM symbols generated for all transmit antennas in the three symbol periods.

In another design, which is not shown in FIG. 5, a phase may be applied to both layers in each tile prior to precoding in order to reduce the phase selection complexity. In this design, a phase of φ1 may be applied to both layers in tile 1, a phase of φ2 may be applied to both layers in tile 2, and so on, and a phase of φM may be applied to both layers in tile M. In general, a phase may be applied to one or more layers in one or more tiles.

A receiver may obtain received data symbols and received pilot symbols from the M tiles. In one design, the receiver may derive a channel estimate for each layer in each tile based on the received pilot symbols for that layer in that tile. The receiver may then perform coherent demodulation for the received data symbols for each layer in each tile based on the channel estimate for that layer in that tile. The receiver may thus perform channel estimation and coherent demodulation for each layer in each tile separately and does not need to know the phases applied by the transmitter.

In another design, the receiver may derive a channel estimate for a layer across multiple tiles (e.g., across all M tiles) based on the received pilot symbols for the layer in these tiles. In this design, the transmitter may send information indicating the phase used for each layer in each tile. Alternatively, the receiver may estimate the phase used for each layer in each tile. In any case, the receiver may remove the phase from each layer in each tile. The receiver may then derive the channel estimate for each layer across the multiple tiles based on the received pilot symbols for that layer in these tiles, after the phase removal. The receiver may then perform coherent demodulation for the received data symbols for each layer in the multiple tiles with the channel estimate for that layer in these tiles.

In yet another design, the receiver may derive a channel estimate for all layers in each tile based on the received pilot symbols for these layers in the tile. The receiver may then perform coherent demodulation for the received data symbols for the layers in each tile based on the channel estimate for that tile. In general, the receiver may perform joint channel estimation across tiles and/or across layers based on the known phases applied to these layers and/or tiles. The receiver may obtain these phases from the transmitter or may estimate these phases based on a phase estimation scheme.

Figure 6:
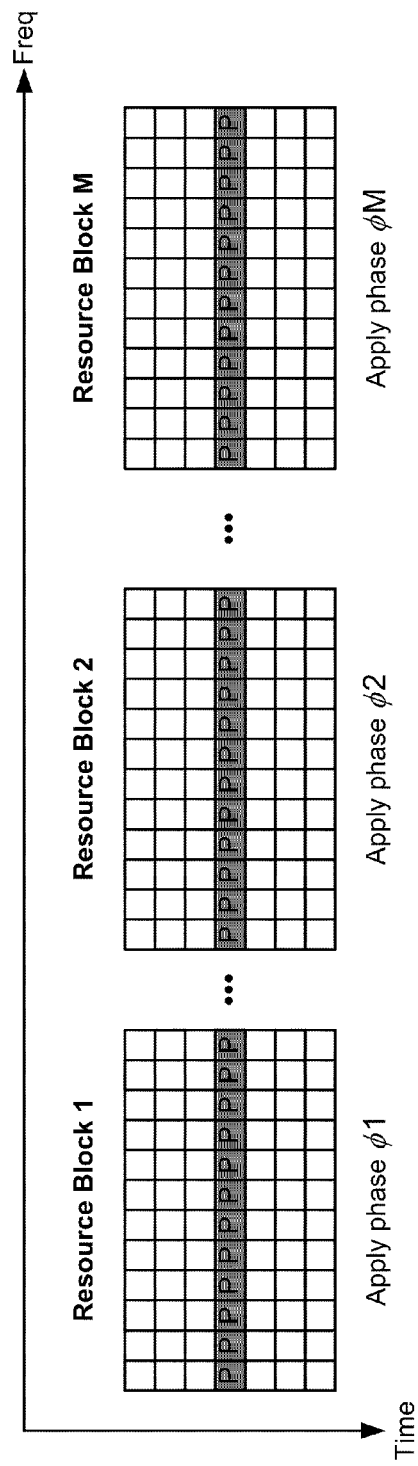
FIG. 6 shows an exemplary data transmission on a single layer in LTE.

FIG. 6 shows an example of data transmission on one layer in LTE. A UE may be assigned M resource blocks, which may cover different sets of subcarriers in seven symbol periods of a slot, as shown in FIG. 6. The M resource blocks may occupy non-contiguous sets of contiguous subcarriers for N×SC-FDMA, as shown in FIG. 6. In one design, each resource block may include 12 pilot resource elements in the middle symbol period and 36 data resource elements on each side of the pilot resource elements. An SC-FDMA symbol may be generated for each symbol period in the slot.

In one design, a phase may be applied to each resource block. As shown in FIG. 6, a phase of φ1 may be applied to resource block 1, a phase of φ2 may be applied to resource block 2, and so on, and a phase of φM may be applied to resource block M. The M phases φ1 to φM may be selected to minimize the maximum PAPR or cubic metric of the SC-FDMA symbols generated for the M resource blocks. The data symbols and pilot symbols for each resource block may be multiplied with the phase for that resource block to obtain phase-rotated symbols. Seven SC-FDMA symbols may be generated for the seven symbol periods based on the phase-rotated symbols for the M resource blocks.

Multiple layers may also be sent on the M resource blocks. For two layers, six pilot resource elements in each resource block may be assigned to each layer, e.g., by assigning alternative pilot resource elements to one layer. A phase may then be applied to each layer in each resource block. The phases for the two layers in the M resource blocks may be selected to reduce the PAPR or cubic metric of the SC-FDMA symbols generated for the M resource blocks for all transmit antennas.

FIGS. 4, 5 and 6 show exemplary transmissions in WiMAX and LTE. Data and pilot may also be transmitted on resource blocks or tiles in other manners. In general, data and/or pilot may be sent on any number of resource blocks or tiles and on any number of layers in each resource block or tile. A transmitter may apply a phase to each set of resources. A set of resources may comprise (i) resource elements in one or more resource blocks or tiles, (ii) resource elements for a layer in one or more resource blocks or tiles, or (iii) resources that may be defined in other manners. A receiver may perform channel estimation and coherent demodulation for each set of resources.

Figure 7:
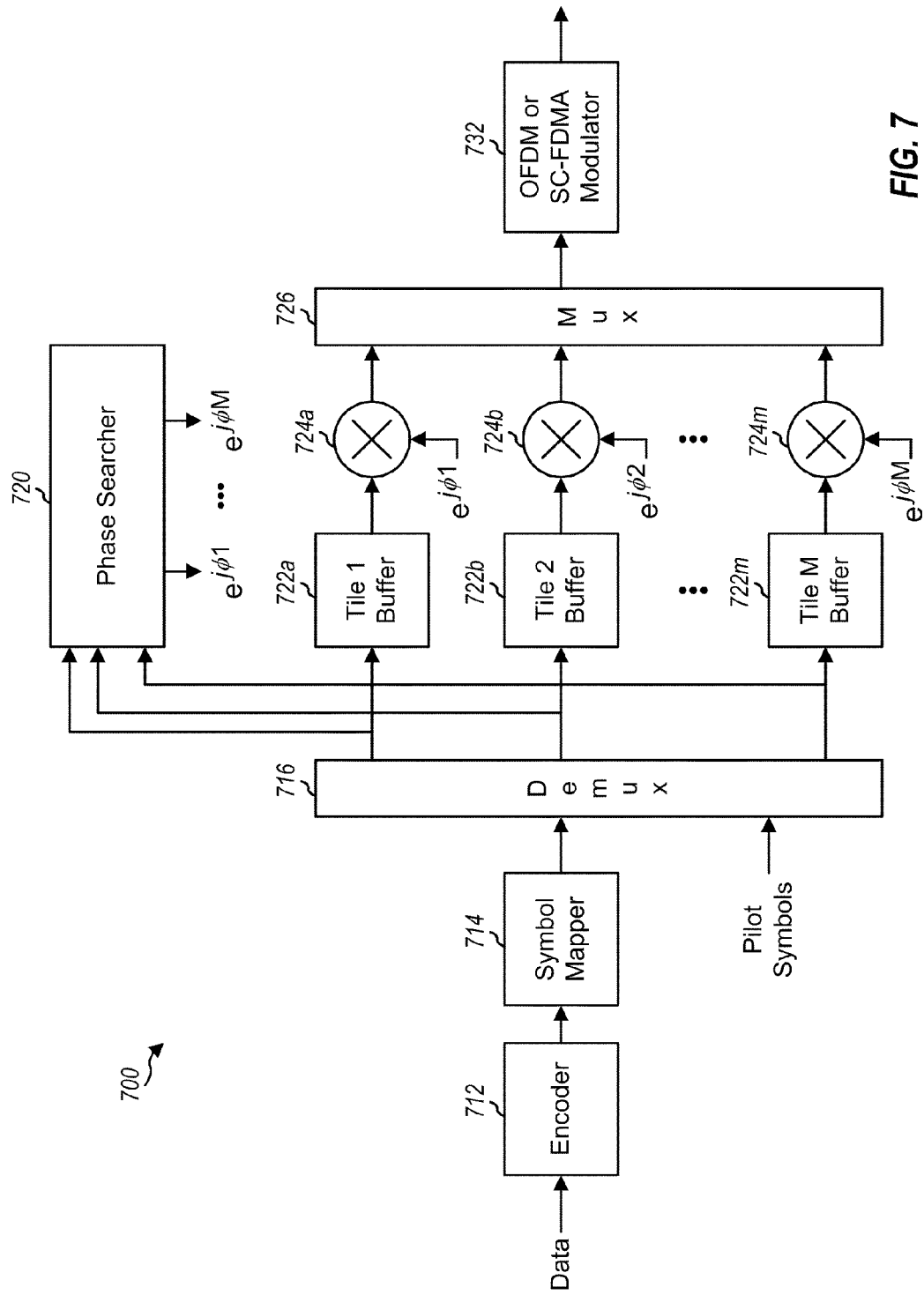
FIG. 7 shows a block diagram of a transmitter.

FIG. 7 shows a block diagram of a design of a transmitter 700, which may be part of base station 110 or UE 150 in FIG. 1. For simplicity, FIG. 7 shows the case of one transmit antenna. Within transmitter 700, an encoder 712 may encode traffic data and/or control data, perform interleaving, and provide coded data. A symbol mapper 714 may map the coded data to data symbols based on one or more modulation schemes. A demultiplexer (Demux) 716 may demultiplex the data symbols and pilot symbols to M tiles assigned for data transmission and may provide the data symbols and pilot symbols for the M tiles to M buffers 722*a* through 722*m*. A phase searcher 720 may also receive the data symbols and pilot symbols from demultiplexer 718. Phase searcher 720 may select the phases for the M tiles, as described below. M multipliers 724*a* through 724*m* may apply the phases for the M tiles by multiplying the data symbols and pilot symbols for each tile with a phasor $e^{j\phi m}$ defined by the phase φm for that tile. A multiplexer (Mux) 726 may receive the phase-rotated symbols from multipliers 724*a* through 724*m* and may provide the phase-rotated symbols to OFDM or SC-FDMA modulator 732. Modulator 732 may generate OFDM symbols or SC-FDMA symbols based on the phase-rotated symbols.

FIG. 7 shows a specific design of transmitter 700 for a single transmit antenna. The processing by transmitter 700 may also be performed in other manners. For a transmitter with multiple transmit antennas, each layer in each tile may have a buffer to store the data symbols and/or pilot symbols for that layer and tile. Different layers may be sent from each transmit antenna with precoding. A set of phases may be applied to different layers in different tiles before precoding. These phases may be jointly selected to minimize the maximum PAPR or cubic metric of the OFDM symbols or SC-FDMA symbols sent from the multiple transmit antennas, as described below.

The phases for the M tiles or resource blocks may be selected based on any suitable metric such as PAPR, cubic metric, etc. For clarity, the term "tile" is used in much of the description below. The PAPR or cubic metric may be computed for an OFDM symbol or an SC-FDMA symbol. For clarity, much of the description below is for OFDM symbols but may be readily extended to SC-FDMA symbols.

The PAPR of an OFDM symbol may be computed as follows:

$$PAPR(n) = \frac{\max_t \{|s(n, t)|^2\}}{\varepsilon\{|s(n, t)|^2\}}, \text{ and} \quad \text{Eq (2)}$$

$$\varepsilon\{|s(n, t)|^2\} = \frac{1}{T} \cdot \sum_{t=1}^{T} |s(n, t)|^2, \quad \text{Eq (3)}$$

where s(n,t) is the t-th time-domain sample for OFDM symbol n, and PAPR(n) is the PAPR of OFDM symbol n.

As shown in equations (2) and (3), the PAPR may be equal to the ratio of the peak power to the average power of the samples for the OFDM symbol. The PAPR may thus characterize the maximum deviation from the mean and may be given in linear unit.

The cubic metric for N OFDM symbols (e.g., three OFDM symbols in FIG. 4 or 5) in the current time slot may be computed as follows:

$$CM = \frac{RCM - Q1}{Q2}, \text{ and} \quad \text{Eq (4)}$$

$$RCM = 10 \cdot \log_{10}\left(\frac{1}{N \cdot T} \cdot \sum_{n=1}^{N} \sum_{t=1}^{T} |s(n, t)|^6\right), \quad \text{Eq (5)}$$

where Q1 and Q2 are two constants, e.g., Q1=1.52, and Q2=1.56 or 1.85, and CM is the cubic metric of the OFDM symbols for the current time slot.

As shown in equations (4) and (5), the cubic metric may be defined by a function of the variations in the amplitude of the OFDM symbols. The cubic metric may characterize the variation statistics of the entire output waveform and may be given in units of decibel (dB). The time-domain samples of the OFDM symbols may be normalized so that $\varepsilon\{|s(n,t)|^2\}=1$.

In one design, the phases for the M tiles may be determined by evaluating all possible combinations of phases for the M tiles. For the designs shown in FIGS. 4 and 6, each phase combination may include a specific phase for each of the M tiles and may be considered as a hypothesis to evaluate. In one design, the phase for each tile (or each layer in each tile) may be selected from a set of L possible phases. For example, if L=4, then a set of four possible phases may include {−π, −π/2, 0, π/2}, and the phase for each tile (or each layer in each tile) may be equal to −π, −π/2, 0 or π/2.

For clarity, much of the description below assumes that one phase is applied to each tile, e.g., as shown in FIG. 4 or 6. In this case, a total of LM phase combinations may be evaluated for the M tiles with a set of L possible phases. Each phase combination may be evaluated as follows:

1. Apply the M phases in the phase combination to the M tiles,
2. Generate three OFDM symbols with the M phases applied to the M tiles,
3. Compute the PAPR (or cubic metric) of each OFDM symbol, and
4. Find the maximum PAPR among the PAPRs (or the maximum cubic metric among the cubic metrics) of the three OFDM symbols.

The phase combination that provides the smallest maximum PAPR or the smallest maximum cubic metric may be selected.

M phases in a given phase combination may be applied to the modulation symbols in the frequency domain, and OFDM symbols may be generated based on the phase-rotated symbols. Since IFFT is a linear function, applying the phases to the modulation symbols in the frequency domain may be equivalent to applying the phases to the time-domain samples from the IFFT.

In one design, to simplify the computation of the PAPR or cubic metric in evaluating different phase combinations, the phases may be applied in the time domain instead of the frequency domain. In this design, three OFDM symbols may be generated for each tile based on the modulation symbols to be sent in that tile and zero symbols for remaining resource elements. A total of 3M OFDM symbols may be generated for the M tiles for three symbol periods and may be stored. Each phase combination may then be evaluated as follows:

1. Apply each phase in the phase combination to the three OFDM symbols generated for a corresponding tile to obtain three phase-rotated OFDM symbols for the tile,
2. Sum M phase-rotated OFDM symbols for the M tiles in each symbol period to obtain a composite OFDM symbol for that symbol period,
3. Compute the PAPR (or cubic metric) of each composite OFDM symbol, and
4. Find the maximum PAPR among the PAPRs (or the maximum cubic metric among the cubic metrics) of the three composite OFDM symbols.

For step 1, the phase for each tile may be applied to the three OFDM symbols generated for that tile, as follows:

$$\tilde{s}_m(n,t) = e^{j\phi_m} \cdot s_m(n,t),  \quad \text{Eq (6)}$$

where
$s_m(n,t)$ is the t-th time-domain sample for OFDM symbol n generated for tile m,
$\phi m$ is the phase for tile m, and
$\tilde{s}_m(n,t)$ is a phase-rotated sample corresponding to time-domain sample $s_m(n,t)$.

For step 2, the M phase-rotated OFDM symbols for the M tiles in symbol period n may be summed, as follows:

$$s(n,t) = \sum_{m=1}^{M} \tilde{s}_m(n,t), \quad \text{Eq (7)}$$

where $s(n,t)$ is the t-th time-domain sample for composite OFDM symbol n.

For the above design, the OFDM symbols for each tile may be computed once and stored, instead of being computed for each phase combination. For each phase combination, the M phases may be applied to the pre-computed OFDM symbols for the M tiles as shown in equation (6), and three composite OFDM symbols may be generated as shown in equation (7).

The PAPR or cubic metric may then be computed for each composite OFDM symbol, as shown in equation (2) or (4). The phase combination with the smallest maximum PAPR or cubic metric may be selected. Computational complexity for the PAPR or cubic metric may be greatly reduced by pre-computing the three OFDM symbols for each tile.

In one design, a brute force phase search may be performed to select the phases for the M tiles. If one phase is applied to each tile, then LM phase combinations may be evaluated for M tiles with a set of L possible phases. L may be selected based on the desired phase resolution, and the L possible phases may be uniformly distributed between $-\pi$ and $\pi$. The number of phase combinations to evaluate may be large and may grow exponentially with the number of possible phases (L). For example, if M=3 tiles are assigned, then 64 phase combinations may be evaluated for L=4 possible phases, and 512 phase combinations may be evaluated for L=8 possible phases. Evaluating $L^M$ possible phase combinations with the brute force phase search may be computationally intensive, especially when fine phase resolution is desired and L is relatively large.

In another design, an iterative phase search may be performed to determine the phases for the M tiles. Multiple iterations may be performed for the iterative phase search. For the first iteration, a full range of $2\pi$ with coarse resolution may be searched to determine phases with coarse resolution for the M tiles. For each subsequent iteration, a smaller range of phases centered at the phases from the prior iteration may be searched to determine phases with finer resolution for the M tiles.

Figure 8:
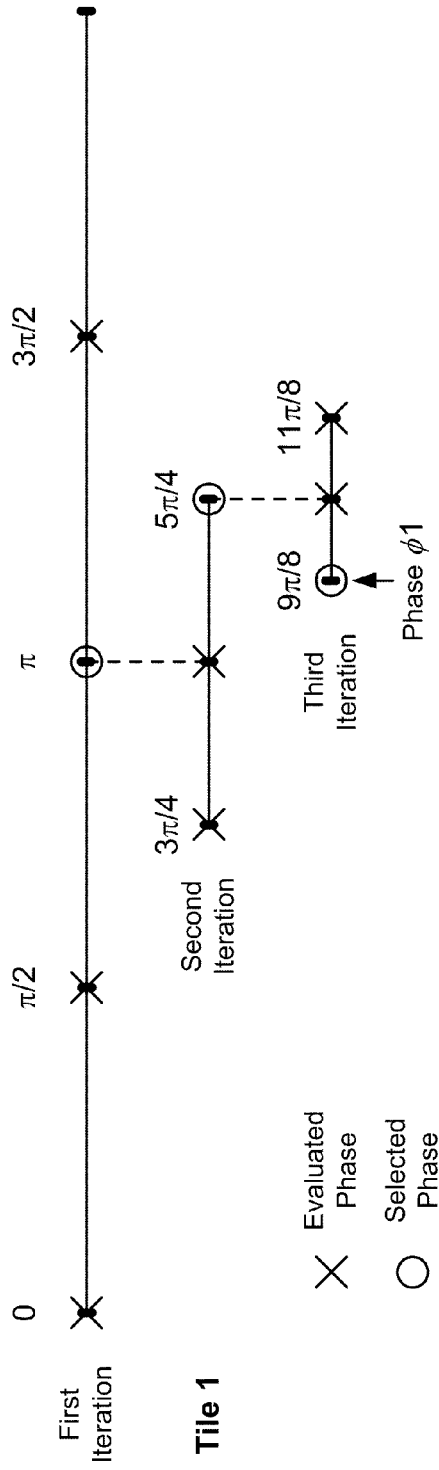
FIG. 8 shows an example of iterative phase search for two resource blocks.
Figure 8:
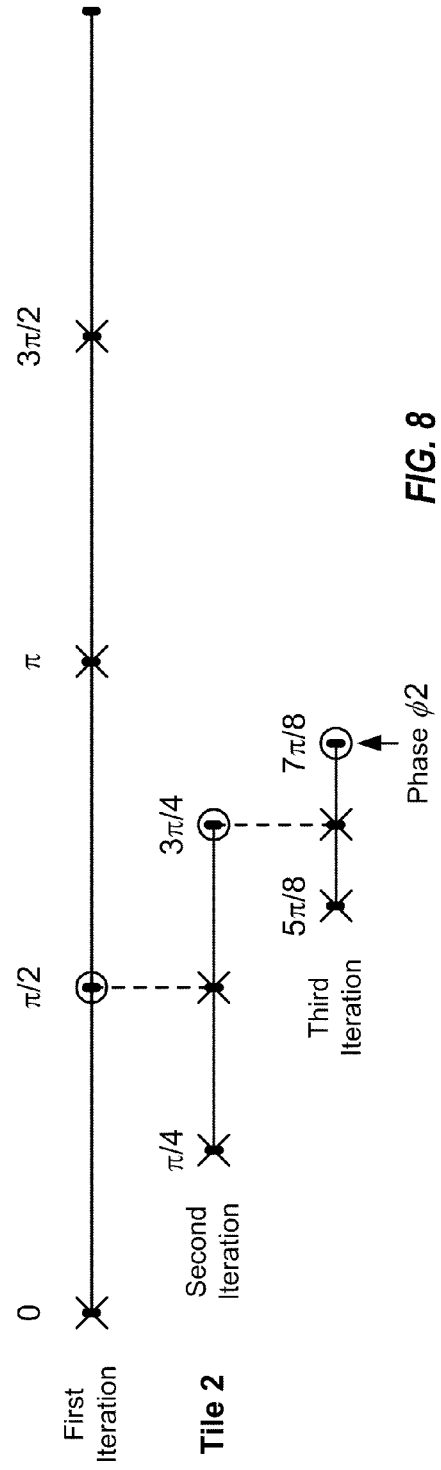

FIG. 8 shows an example of iterative phase search for two tiles. For the first iteration, a full range of $2\pi$ with resolution of $\pi/2$ may be searched, a phase of 0, $\pi/2$, $\pi$ or $3\pi/2$ may be applied to each tile, and 16 phase combinations may be evaluated for the two tiles. In this example, a phase of $\pi$ for tile 1 and a phase of $\pi/2$ for tile 2 provide the smallest maximum PAPR or cubic metric in the first iteration.

For the second iteration, a smaller range of $\pi/2$ with resolution of $\pi/4$ may be searched, a phase offset of 0, $-\pi/4$ or $\pi/4$ may be applied to the phase for each tile from the first iteration, and 9 phase combinations may be evaluated for the two tiles. In this example, a phase of $5\pi/4$ for tile 1 and a phase of $3\pi/4$ for tile 2 provide the smallest maximum PAPR or cubic metric in the second iteration.

For the third iteration, a smaller range of $\pi/4$ with resolution of $\pi/8$ may be searched, a phase offset of 0, $-\pi/8$ or $\pi/8$ may be applied to the phase for each tile from the second iteration, and 9 phase combinations may be evaluated for the two tiles. In this example, a phase of $9\pi/8$ for tile 1 and a phase of $7\pi/8$ for tile 2 provide the smallest maximum PAPR or cubic metric in the third iteration.

In the example shown in FIG. 8, a total of 16+9+9=34 phase combinations may be evaluated in three iterations to obtain two phases with resolution of $\pi/8$ for two tiles. In contrast, a total of 256 phase combinations may be evaluated in a single iteration to obtain two phases with resolution of $\pi/8$ for two tiles. Performing phase search in multiple iterations may thus greatly reduce computational complexity.

In general, for the first iteration, a full range of $2\pi$ with resolution of $\pi/R$ may be searched, a set of R possible phases may be used for each tile, and $R^M$ phase combinations may be evaluated for the M tiles. R may be equal to four or some other value and may be the same for all iterations or different for different iterations. The phase selected for tile m in iteration i may be denoted as $\phi_m(i)$. A search range of $\phi_m(i)$ plus $[-\pi/R, \pi/R]$ with resolution of $2\pi/R^2$ may be applicable for tile m in the second iteration. The number of phase combinations may be $R^M$ in the second iteration. The same procedure may be repeated for each subsequent iteration. For the S-th iteration, the phase selected for tile m in iteration S−1 may be denoted as $\phi_m(S-1)$. A search range of $\phi_m(S-1)$ plus $[-\pi/R^{S-1}, \pi/R^{S-1}]$ with resolution of $2\pi/R^S$ may be applicable for tile m in the S-th iteration. $R^M$ phase combinations may be evaluated in each iteration, and a total of $S \cdot R^M$ phase combinations may be evaluated for all S iterations. The complexity of the iterative phase search may be controlled by choosing proper values for R and S.

The iterative phase search may reduce the search range and improve the phase resolution based on the results from the previous iteration. Computer simulations indicate that the iterative phase search may provide better performance with similar complexity as the brute force phase search.

Regardless of how the phase search may be performed, the PAPR or cubic metric may be determined for each phase combination. The phase combination that minimizes the maximum PAPR may be selected and may be expressed as:

$$\{\phi\}_{selected} = \min_{\{\phi\}}\{\max_{u,n}[PAPR_{u,n}(\{\phi\})]\}, \quad \text{Eq (8)}$$

where $PAPR_{u,n}(\{\phi\})$ is the PAPR of OFDM symbol n for transmit antenna u, $\{\phi\}$ denotes a combination of phases for the M tiles, and $\{\phi\}_{selected}$ denotes a selected combination of phases.

The phase combination that minimizes the maximum cubic metric may also be selected and may be expressed as:

$$\{\phi\}_{selected} = \min_{\{\phi\}}\{\max_{u}[CM_u(\{\phi\})]\}, \quad \text{Eq (9)}$$

where $CM_u(\{\phi\})$ is the cubic metric for the OFDM symbols sent from transmit antenna u.

Computer simulation was performed to quantify the amount of improvement achieved with the techniques described herein. For the computer simulation, six 4×3 tiles were assigned to a UE and were distributed in frequency with an inter-tile spacing of four subcarriers. 1000 realizations were simulated, with the six tiles being populated with pseudo-randomly generated QPSK modulation symbols in each realization. For the baseline case, the maximum PAPR was determined for the three OFDM symbols in each realization without applying any phase, and statistics were obtained for the maximum PAPR for the 1000 realizations.

For a second case, performance was determined for a scenario in which six phases were applied to the six tiles and were determined with one iteration. For each realization, six phases were applied to the six tiles, and each phase was selected from a set of four possible phases of $\{-\pi, -\pi/2, 0, \pi/2\}$. The phase combination that provided the smallest maximum PAPR was selected. Statistics were obtained for the maximum PAPR for the 1000 realizations.

For a third case, performance was determined for a scenario in which six phases were applied to the six tiles and were determined with two iterations. The first iteration matches the second case described above. For the second iteration, the phases for the six tile were searched again based on the search results from the first iteration. The phase range for each tile was $-\pi/4$ to $\pi/4$ and centered at the phase provided by the first iteration.

FIG. 9 shows a complementary cumulative distribution function (CCDF) of the PAPR for the three cases described above. A plot 912 shows PAPR statistics for the baseline case with no phases applied to the six tiles. A plot 914 shows PAPR statistics for the second case with the phases applied to the six tiles being determined with one iteration. A plot 916 shows PAPR statistics for the third case with the phases applied to the six tiles being determined with two iterations. As shown by plots 912, 914 and 916, at a probability of $10^{-2}$, the PAPR is reduced by about 2.5 dB with the phases determined with one iteration and by about 2.8 dB with the phases determined with two iterations. The reduction in PAPR may be greater for more tiles.

Computer simulation was also performed for data transmission on multiple resource blocks and also on multiple layers. The computer simulation indicated substantial improvement in PAPR and cubic metric by applying properly selected phases to the resource blocks and/or layers.

For clarity, much of the phase search has been described for the design in which one phase is applied to each tile. Multiple phases may also be applied to each tile, e.g., for multiple layers in the tile. The phase search described above may be extended to any number of phases for each tile. More phase combinations may be evaluated to determine the multiple phases for each tile.

A transmitter may or may not perform precoding. If precoding is performed, then the phases may be applied to modulation symbols to be sent on the tiles prior to precoding, precoding may be performed on the phase-rotated symbols to obtain output symbols, and OFDM symbols may be generated for multiple transmit antennas based on the output symbols. The phases may be selected to reduce the maximum PAPR across all OFDM symbols for all transmit antennas. If precoding is not performed, then the phases may be applied to modulation symbols to be sent on the tiles, the phase-rotated symbols may be demultiplexed to one or more transmit antennas, and OFDM symbols may be generated for one or more transmit antennas based on the output symbols. The phases may be selected to reduce the maximum PAPR across all OFDM symbols for all transmit antenna(s).

The techniques described herein may reduce PAPR and/or cubic metric in multi-carrier systems with multiple resource blocks/tiles and/or multiple spatial layers, where channel estimation may be performed for each layer in each tile. The techniques may be used for (i) the uplink in WiMAX with multiple tiles and tile-based channel estimation, (ii) the uplink in LTE and LTE-A with multiple resource blocks and channel estimation for each resource block, (iii) UMB in a block-hopping mode, and/or (iv) other radio technologies and systems. The techniques do not require a transmitter to send additional side information or a receiver to estimate this side information. The techniques may be used for OFDM, SC-FDMA, multiple carriers, etc. The techniques may be independent of the data signal format used in each tile, and a modulation symbol sent on each resource element may be any arbitrary complex value, e.g., an arbitrary modulation symbol or an OFDM/SC-FDMA component.

The techniques described herein may also be used for a multi-carrier system with multiple carriers. A phase may be applied to each carrier. The phases for the multiple carriers may be selected jointly based on a metric, which may be PAPR, cubic metric, etc. The phases for the multiple carriers may be updated in each update interval, which may be defined based on an expected channel estimation interval at the receivers. For example, data may be sent in each transmission time interval (TTI) of 2 milliseconds (ms), and a channel estimate may be derived for each TTI. The phases may then be updated in each TTI.

FIG. 10 shows a design of a process 1000 performed by a transmitter, e.g., a UE for data transmission on the uplink or a base station for data transmission on the downlink. The transmitter may select phases for a plurality of resource blocks based on a metric (block 1012). The resource blocks may also be referred to as tiles and may cover contiguous or non-contiguous sets of subcarriers, one set of subcarriers for each resource block. The transmitter may apply the selected phases to modulation symbols to be sent on the plurality of resource blocks, e.g., as shown in equation (1) (block 1014). In one design, the metric may comprise PAPR or cubic metric, and the phases for the plurality of resource blocks may be selected to reduce the PAPR or the cubic metric of at least one output waveform generated with the modulation symbols after applying the selected phases.

The modulation symbols may comprise data symbols and/or pilot symbols. The pilot symbols may be for a reference signal, a demodulation reference signal, etc. In one design, the transmitter may select one phase for each resource block and may apply the selected phase to all data symbols and pilot symbols to be sent on the resource block, e.g., as shown in FIG. 4 or 6. In another design, the transmitter may select multiple phases for multiple spatial layers in each resource block, one phase for each spatial layer, e.g., as shown in FIG. 5. The transmitter may apply each phase to all data symbols and pilot symbols to be sent on one spatial layer in one resource block. Each spatial layer may be assigned a different subset of resource elements to use for pilot transmission in each resource block. The transmitter may apply the phase for each spatial layer in each resource block to (i) pilot symbols to be sent on the subset of resource elements assigned to the spatial layer for pilot transmission and (ii) data symbols to be sent on resource elements used for data transmission in the resource block.

In one design of block 1012, the transmitter may compute the metric for each of a plurality of phase combinations. Each phase combination may comprise at least one phase for each resource block. The transmitter may select a phase combination with a best metric among the plurality of phase combinations. The transmitter may obtain the selected phases for the plurality of resource blocks from the selected phase combination. In one design, the transmitter may perform a single iteration to evaluate the plurality of phase combinations. In another design, the transmitter may select the phases for the plurality of resource blocks in multiple iterations, e.g., as described above. Each phase may be selected from a progressively smaller phase range and may have progressively finer resolution for progressively later iteration.

In one design, the transmitter may generate at least one OFDM symbol or at least one SC-FDMA symbol based on the modulation symbols after applying the selected phases (block 1016). In one design, the transmitter may generate the at least one OFDM or SC-FDMA symbol without performing precoding. In another design, the transmitter may perform precoding on the modulation symbols after applying the selected phases to obtain a plurality of streams of output symbols for a plurality of transmit antennas. The transmitter may then generate at least one OFDM or SC-FDMA symbol for each transmit antenna based on a stream of output symbols for that transmit antenna. For both designs, the phases for the plurality of resource blocks may be selected to reduce the PAPR or the cubic metric of all OFDM symbols or SC-FDMA symbols generated for all transmit antennas. In one design, the transmitter may be a UE and may send the OFDM symbol(s) or SC-FDMA symbol(s) to a base station. In another design, the transmitter may be a base station and may send the OFDM symbol(s) or SC-FDMA symbol(s) to a UE.

FIG. 11 shows a design of an apparatus 1100 for transmitting data. Apparatus 1100 includes a module 1112 to select phases for a plurality of resource blocks based on a metric, a module 1114 to apply the selected phases to modulation symbols (e.g., data symbols and/or pilot symbols) to be sent on the plurality of resource blocks, and a module 1116 to generate at least one OFDM symbol or at least one SC-FDMA symbol based on the modulation symbols after applying the selected phases.

FIG. 12 shows a design of a process 1200 performed by a receiver, e.g., a base station for data transmission on the uplink or a UE for data transmission on the downlink. The receiver may demodulate at least one OFDM symbol or at least one SC-FDMA symbol (block 1212). The receiver may obtain received pilot symbols and received data symbols from a plurality of resource blocks, which may carry data symbols and pilot symbols applied with phases selected by a transmitter based on a metric (e.g., PAPR or cubic metric) to reduce PAPR (block 1214). The receiver may derive at least one channel estimate for each set of at least one resource block, among the plurality of resource blocks, based on the received pilot symbols from that set of at least one resource block (block 1216). The receiver may then process (e.g., coherently demodulate or detect) the received data symbols from each set of at least one resource block based on the at least one channel estimate for that set of at least one resource block (block 1218).

In one design, the transmitter may apply one phase to all data symbols and pilot symbols sent on each resource block. The receiver may derive a channel estimate for each resource block based on the received pilot symbols from that resource block and may use the channel estimate to process the received data symbols from the resource block. In another design, each resource block may carry multiple spatial layers, and the transmitter may apply one phase to all data symbols and pilot symbols sent on each spatial layer in each resource block. The receiver may derive a channel estimate for each spatial layer in each resource block based on the received pilot symbols for the spatial layer in the resource block and may use the channel estimate to process the received data symbols for the spatial layer in the resource block.

In yet another design, the receiver may perform joint channel estimation across multiple resource blocks. The receiver may determine phases applied to the multiple resource blocks, e.g., based on phase information received from the transmitter or estimated by the receiver. The receiver may then derive a channel estimate for the multiple resource blocks based on the determined phases and the received pilot symbols from the multiple resource blocks. In general, the receiver may perform channel estimation and demodulation for one or more spatial layers in one or more resource blocks.

FIG. 13 shows a design of an apparatus 1300 for receiving data. Apparatus 1300 includes a module 1312 to demodulate at least one OFDM symbol or at least one SC-FDMA symbol, a module 1314 to obtain received pilot symbols and received data symbols from a plurality of resource blocks in the at least one OFDM or SC-FDMA symbol, a module 1316 to derive at least one channel estimate for each set of at least one resource block, among the plurality of resource blocks, based on received pilot symbols from that set of at least one resource block, and a module 1318 to process received data symbols from each set of at least one resource block based on the at least one channel estimate for that set of at least one resource block.

The modules in FIGS. 11 and 13 may comprise processors, electronics devices, hardware devices, electronics components, logical circuits, memories, software codes, firmware codes, etc., or any combination thereof. The modules in FIGS. 11 and 13 may be implemented by any of the processors and modules shown in FIG. 1.

FIG. 14 shows a design of a process 1400 performed by a transmitter, e.g., a base station for data transmission on the downlink or a UE for data transmission on the uplink in a multi-carrier system. The transmitter may select phases for a plurality of carriers based on a metric, e.g., PAPR or cubic metric (block 1412). In one design, the transmitter may select the phases for the plurality of carriers in each update interval of a particular duration. The transmitter may apply the selected phases to data to be sent on the plurality of carriers (block 1414).

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   selecting phases for a plurality of resource blocks based on a metric; and
   applying the selected phases to modulation symbols to be sent on the plurality of resource blocks,
   wherein the modulation symbols comprise data symbols and pilot symbols, wherein multiple phases are selected for multiple spatial layers in each resource block, one phase for each spatial layer, and wherein each phase is applied to all data symbols and pilot symbols to be sent on one spatial layer in one resource block, and
   wherein the applying the selected phases to the modulation symbols comprises assigning each spatial layer with a different subset of resource elements used for pilot transmission in each resource block, applying the phase for each spatial layer in each resource block to pilot symbols to be sent on the subset of resource elements assigned to the spatial layer for pilot transmission, and
   applying the phase for each spatial layer in each resource block to data symbols to be sent on resource elements used for data transmission in the resource block;

wherein the metric comprises a peak-to-average power ratio (PAPR) or a cubic metric.

2. The method of claim 1, wherein the phases for the plurality of resource blocks are selected to reduce the PAPR or the cubic metric of at least one output waveform generated with the modulation symbols after applying the selected phases.

3. The method of claim 1, wherein the selecting the phases for the plurality of resource blocks comprises
computing the metric for each of a plurality of phase combinations, each phase combination comprising at least one phase for each resource block,
selecting a phase combination with a best metric among the plurality of phase combinations, and
obtaining the selected phases for the plurality of resource blocks from the selected phase combination.

4. The method of claim 1, wherein the selecting the phases for the plurality of resource blocks comprises selecting the phases for the plurality of resource blocks in multiple iterations, each phase being selected from a progressively smaller phase range and having progressively finer resolution for progressively later iteration.

5. The method of claim 1, further comprising:
generating at least one orthogonal frequency division multiplexing (OFDM) symbol based on the modulation symbols after applying the selected phases.

6. The method of claim 1, further comprising:
generating at least one single-carrier frequency division multiple access (SC-FDMA) symbol based on the modulation symbols after applying the selected phases.

7. The method of claim 1, further comprising:
mapping the modulation symbols, after applying the selected phases, to multiple sets of contiguous subcarriers, the multiple sets being non-contiguous; and
generating at least one single-carrier frequency division multiple access (SC-FDMA) symbol based on the mapped modulation symbols.

8. The method of claim 1, further comprising:
performing precoding on the modulation symbols after applying the selected phases to obtain a plurality of streams of output symbols for a plurality of transmit antennas; and
generating at least one orthogonal frequency division multiplexing (OFDM) symbol or at least one single-carrier frequency division multiple access (SC-FDMA) symbol for each transmit antenna based on a stream of output symbols for the transmit antenna.

9. The method of claim 8, wherein the phases for the plurality of resource blocks are selected to reduce the PAPR or the cubic metric of all OFDM symbols or all SC-FDMA symbols generated for the plurality of transmit antennas.

10. The method of claim 1, further comprising:
generating at least one orthogonal frequency division multiplexing (OFDM) symbol or at least one single-carrier frequency division multiple access (SC-FDMA) symbol based on the modulation symbols after applying the selected phases; and
sending the at least one OFDM symbol or the at least one SC-FDMA symbol from a user equipment (UE) to a base station.

11. The method of claim 1, wherein the plurality of resource blocks cover non-contiguous sets of subcarriers, one set of subcarriers for each resource block.

12. An apparatus for wireless communication, comprising:
means for selecting phases for a plurality of resource blocks based on a metric; and means for applying the selected phases to modulation symbols to be sent on the plurality of resource blocks,
wherein the modulation symbols comprise data symbols and pilot symbols, wherein multiple phases are selected for multiple spatial layers in each resource block, one phase for each spatial layer, and wherein each phase is applied to all data symbols and pilot symbols to be sent on one spatial layer in one resource block, and
wherein the means for applying the selected phases comprises means for assigning each spatial layer with a different subset of resource elements used for pilot transmission in each resource block,
means for applying the phase for each spatial layer in each resource block to pilot symbols to be sent on the subset of resource elements assigned to the spatial layer for pilot transmission, and
means for applying the phase for each spatial layer in each resource block to data symbols to be sent on resource elements used for data transmission in the resource block,
wherein the metric comprises a peak-to-average power ratio (PAPR) or a cubic metric.

13. The apparatus of claim 12, wherein the means for selecting the phases for the plurality of resource blocks comprises
means for computing the metric for each of a plurality of phase combinations, each phase combination comprising at least one phase for each resource block,
means for selecting a phase combination with a best metric among the plurality of phase combinations, and
means for obtaining the selected phases for the plurality of resource blocks from the selected phase combination.

14. The apparatus of claim 12, wherein the means for selecting the phases for the plurality of resource blocks comprises means for selecting the phases for the plurality of resource blocks in multiple iterations, each phase being selected from a progressively smaller phase range and having progressively finer resolution for progressively later iteration.

15. The apparatus of claim 12, further comprising:
means for generating at least one orthogonal frequency division multiplexing (OFDM) symbol or at least one single-carrier frequency division multiple access (SC-FDMA) symbol based on the modulation symbols after applying the selected phases.

16. An apparatus for wireless communication, comprising:
at least one processor configured to select phases for a plurality of resource blocks based on a metric, and to apply the selected phases to modulation symbols to be sent on the plurality of resource blocks,
wherein the modulation symbols comprise data symbols and pilot symbols, and
wherein the at least one processor is configured to select multiple phases for multiple spatial layers in each resource block, one phase for each spatial layer, and to apply each phase to all data symbols and pilot symbols to be sent on one spatial layer in one resource block, and
wherein the at least one processor is configured to assign each spatial layer with a different subset of resource elements used for pilot transmission in each resource block,
apply the phase for each spatial layer in each resource block to pilot symbols to be sent on the subset of resource elements assigned to the spatial layer for pilot transmission, and
apply the phase for each spatial layer in each resource block to data symbols to be sent on resource elements used for data transmission in the resource block;

wherein the metric comprises a peak-to-average power ratio (PAPR) or a cubic metric.

17. The apparatus of claim 16, wherein the at least one processor is configured to compute the metric for each of a plurality of phase combinations, each phase combination comprising at least one phase for each resource block, to select a phase combination with a best metric among the plurality of phase combinations, and to obtain the selected phases for the plurality of resource blocks from the selected phase combination.

18. The apparatus of claim 16, wherein the at least one processor is configured to select the phases for the plurality of resource blocks in multiple iterations, and to select each phase from a progressively smaller phase range and with progressively finer resolution for progressively later iteration.

19. The apparatus of claim 16, wherein the at least one processor is configured to generate at least one orthogonal frequency division multiplexing (OFDM) symbol or at least one single-carrier frequency division multiple access (SC-FDMA) symbol based on the modulation symbols after applying the selected phases.

20. A non-transitory computer-readable medium comprising a computer-program product having instructions thereon, the instructions comprising:
   code for causing at least one computer to select phases for a plurality of resource blocks based on a metric, and
   code for causing the at least one computer to apply the selected phases to modulation symbols to be sent on the plurality of resource blocks wherein the modulation symbols comprise data symbols and pilot symbols,
   wherein multiple phases are selected for multiple spatial layers in each resource block, one phase for each spatial layer, and wherein each phase is applied to all data symbols and pilot symbols to be sent on one spatial layer in one resource block, and
   wherein the code for causing the at least one computer to apply the selected phases comprises code for causing the at least one computer to assign each spatial layer with a different subset of resource elements used for pilot transmission in each resource block,
   code for causing the at least one computer to apply the phase for each spatial layer in each resource block to pilot symbols to be sent on the subset of resource elements assigned to the spatial layer for pilot transmission, and
   code for causing the at least one computer to apply the phase for each spatial layer in each resource block to data symbols to be sent on resource elements used for data transmission in the resource block;
   wherein the metric comprises a peak-to-average power ratio (PAPR) or a cubic metric.

21. A method for wireless communication, comprising:
   selecting phases for a plurality of carriers based on a metric; and
   applying the selected phases to data to be sent on the plurality of carriers,
   wherein the data comprise data symbols and pilot symbols, wherein multiple phases are selected for multiple spatial layers in each carrier, one phase for each spatial layer, and wherein each phase is applied to all data symbols and pilot symbols to be sent on one spatial layer in one carrier, and
   wherein the applying the selected phases to the data comprises assigning each spatial layer with a different subset of resource elements used for pilot transmission in each carrier,
   applying the phase for each spatial layer in each carrier to pilot symbols to be sent on the subset of resource elements assigned to the spatial layer for pilot transmission, and
   applying the phase for each spatial layer in each carrier to data symbols to be sent on resource elements used for data transmission in the carrier;
   wherein the metric comprises a peak-to-average power ratio (PAPR) or a cubic metric.

22. The method of claim 21, wherein the selecting the phases for the plurality of carriers comprises selecting the phases for the plurality of carriers in each update interval of a particular duration.

* * * * *